United States Patent
Gleu

(10) Patent No.: US 11,130,381 B2
(45) Date of Patent: Sep. 28, 2021

(54) AIR SPRING UNIT WITH SHORT CARDANIC FOLD

(71) Applicant: Continental Teves AG & Co. OHG, Frankfurt (DE)

(72) Inventor: Jens-Uwe Gleu, Frankfurt (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 24 days.

(21) Appl. No.: 16/577,250

(22) Filed: Sep. 20, 2019

(65) Prior Publication Data

US 2020/0094642 A1 Mar. 26, 2020

(30) Foreign Application Priority Data

Sep. 20, 2018 (DE) ..................... 10 2018 216 023.6

(51) Int. Cl.
*B60G 11/27* (2006.01)
(52) U.S. Cl.
CPC ........ *B60G 11/27* (2013.01); *B60G 2204/126* (2013.01); *B60G 2206/424* (2013.01)
(58) Field of Classification Search
CPC ......... B60G 2206/424; B60G 2204/126; F16F 9/05; F16F 9/057; F16F 9/055; F16F 9/0409; F16F 9/0418; F16F 9/0445; F16F 9/0454; F16F 9/0463
See application file for complete search history.

(56) References Cited

U.S. PATENT DOCUMENTS

| | | | | |
|---|---|---|---|---|
| 5,080,328 A | * | 1/1992 | Pees | ...................... B29D 22/02 267/122 |
| 5,346,187 A | * | 9/1994 | Drescher | ............... F16F 9/0409 267/122 |
| 6,536,749 B1 | | 3/2003 | Luehmann et al. | |
| 6,651,995 B1 | | 11/2003 | Buettner | |
| 7,213,799 B2 | * | 5/2007 | Behmenburg | ..... B60G 17/0521 267/64.22 |
| 2004/0026837 A1 | * | 2/2004 | Ferrer | ................... F16F 9/0454 267/64.23 |
| 2014/0027962 A1 | * | 1/2014 | Behmenburg | ........ F16F 9/0418 267/64.27 |
| 2014/0049013 A1 | | 2/2014 | Dehmel et al. | |

(Continued)

FOREIGN PATENT DOCUMENTS

| | | |
|---|---|---|
| CN | 103587367 A | 2/2014 |
| CN | 104024683 A | 9/2014 |

(Continued)

OTHER PUBLICATIONS

Machine language translation of DE 4423884, obtained from google.com/patents on Jan. 4, 2021.*

(Continued)

*Primary Examiner* — Paul N Dickson
*Assistant Examiner* — Mary E Young

(57) ABSTRACT

An air spring unit for a vehicle is described. The air spring unit forms a rolling fold and a cardanic fold. A type of bellows guidance of the air spring, the cardanic fold begins, at the rolling fold side, below that end of the external guide of the air spring unit which is at the air spring cover side. A cardanic fold of axially short construction is realized which, despite a small axial structural space, has the elasticity of a cardanic fold of tall construction.

12 Claims, 3 Drawing Sheets

(56) References Cited

U.S. PATENT DOCUMENTS

| | | | |
|---|---|---|---|
| 2014/0246817 A1* | 9/2014 | Bounds | F16F 9/049 |
| | | | 267/64.24 |
| 2014/0252743 A1* | 9/2014 | Pielock | B60G 17/0485 |
| | | | 280/124.157 |
| 2014/0374972 A1 | 12/2014 | Kroeger | |
| 2016/0121681 A1* | 5/2016 | Rebernik | B60G 11/27 |
| | | | 267/64.27 |

FOREIGN PATENT DOCUMENTS

| | | | |
|---|---|---|---|
| DE | 4423884 A1 * | 1/1996 | B60G 15/12 |
| DE | 4423884 A1 | 1/1996 | |
| DE | 19607804 C1 | 5/1997 | |
| EP | 1144210 B1 | 11/2005 | |
| GB | 935831 A * | 9/1963 | F16F 9/0445 |
| JP | 2011080549 A | 4/2011 | |

OTHER PUBLICATIONS

Search Report dated May 29, 2019 from corresponding German Patent Application No. 10 2018 216 023.6.

* cited by examiner

AIR SPRING UNIT WITH SHORT CARDANIC FOLD

CROSS REFERENCE TO RELATED APPLICATIONS

This application claims priority to German Patent Application No. DE 10 2018 216 023.6, filed Sep. 20, 2018, wherein the contents of such application is incorporated herein by reference.

TECHNICAL FIELD

An air spring unit for a vehicle.

TECHNICAL BACKGROUND

Externally guided air springs can preferably tolerate as far as possible purely axial spring movements. Additional movements that go beyond this, which are referred to as cardanic and torsion, are highly detrimental to the service life of the rolling fold. By means of compensating elements, said air springs must therefore be decoupled as effectively as possible, and thus isolated from the rolling fold of the air spring bellows.

According to the prior art, various devices are known for the decoupling. Here, as a particularly inexpensive solution, the use of cardanic folds is customary.

To form a cardanic fold, the external guide of the air spring is not fastened directly to the air spring cover, but is rather fastened, spaced apart from the cover, to the air spring bellows. Thus, that end of the rolling bellows which is at the air spring cover side emerges from the external guide from the inside and forms a cardanic fold, because the radial supporting action of the external guide is absent where the bellows emerges, and the internal pressure is absent. At that end of the cardanic fold which is at the cover side, said cardanic fold is clamped to the air spring cover.

According to the prior art, the bellows guidance is always realized such that the upper bellows portion which forms a structural unit with the later rolling fold is, after emerging from the external guide, guided directly, forming the cardanic fold, in an axial direction to the air spring cover clamping. Only after the air spring cover clamping is reached is use made of variously designed reinforcements of the cardanic fold, which are made up of various folded-back bellows parts or additional annular components.

SUMMARY

An air spring unit for a vehicle is described. The air spring unit forms a rolling fold and a cardanic fold. A type of bellows guidance of the air spring, the cardanic fold begins, at the rolling fold side, below that end of the external guide of the air spring unit which is at the air spring cover side. A cardanic fold of axially short construction is realized which, despite a small axial structural space, has the elasticity of a cardanic fold of tall construction.

Figure 1:
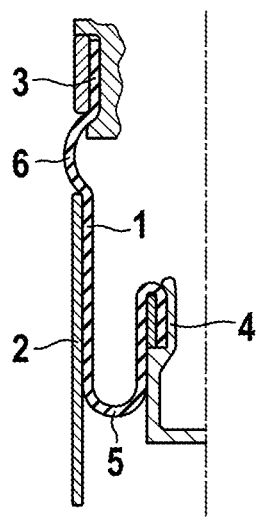
FIG. 1 shows a longitudinal section through a part of an air spring unit according to the prior art.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

Creating an air spring unit of the stated type which has a cardanic fold which is of axially short construction and which, despite a small axial structural space, has the elasticity of a cardanic fold of tall construction.

Here, it is additionally sought for secure fixing of the external guide to the bellows to be ensured. It is furthermore sought for the structural height of the external guide to be utilized as optimally as possible as a rolling track of the bellows and thus for the material usage for the external guide to be minimized.

This object is achieved according to the invention in the case of an air spring unit of the stated type in that the bellows extends from the rolling fold, around that end of the external guide which is at the air spring cover side, so as to loop around said end, and back in the direction of the rolling fold, is subsequently clamped by means of a bracing ring so as to be positioned against the external guide from the outside, and, after exiting the bracing ring at the bottom side thereof at the rolling fold side, is turned up again in the direction of the air spring cover clamping and is guided in the direction of the air spring cover clamping so as to form the cardanic fold.

This special type of bellows guidance designed according to the invention ensures, correspondingly to the selected geometrical relationships, that the cardanic fold starts, at the side of the rolling fold, below that end of the external guide which is at the air spring cover side, starting on the outer side of the external guide. This type of start of the cardanic fold, at the side of the rolling fold, below that and of the external guide which is at the cover side has the following advantages:

A connection between external guide and bellows is possible which permits rolling of the bellows as far as that end of the external guide which is at the air spring cover side. This is duly also possible in the case of other connections by means of a clamping ring onto the external guide from the outside, but not in combination with the advantages stated below.

That detachment point of the rolling fold which is the furthest possible in the direction of the air spring cover is substantially displaced into the axial structural space of the cardanic fold. Thus, the axially required structural space of the cardanic fold and of the rolling surface of the external guide are nested one inside the other, which is not the case in bellows guidance according to the prior art, where these axial structural spaces are always arranged one above the other.

An enlargement of the axial structural height of the cardanic fold with correspondingly improved capability for decoupling kinematic additional movements on the air spring from the axial components need not, owing to the nested configuration, come at the expense of the overall axial structural space. Rather, by virtue of the point at which the bellows emerges from the lower edge, at the rolling fold side, of the bracing ring being positioned lower (closer toward the rolling piston), an enlargement of the structural height of the cardanic fold is achieved which is substantially independent of the total axial structural space that is taken up.

The loading of the external guide clamping is fundamentally changed. The looping between bellows and external guide, which is present owing to the construction, at that end of said external guide which is at the air spring cover side realizes a major pan of the breakaway resistance. The clamping only has to accommodate the tension that is directed radially outward from the cardanic fold. This can be easily implemented by means of a corresponding wall thickness of the bracing ring.

As in the case of a clamping from the outside, the external guide no longer needs to be plastically deformed. It is thus possible, for the external guide, to use materials which exhibit no pronounced plastic behavior in the event of large deformations, such as relatively high-strength aluminum alloys or plastics. Relatively high-strength aluminum alloys make it possible for the external guide to be formed with relatively thin wall thicknesses, resulting in a weight saving. The use of plastics permits more inexpensive production of the external guides and yields a significant weight advantage. In particular, the use of fiber-reinforced plastics or bandaged structural forms of the external guide is possible.

The air spring unit designed according to the invention thus makes it possible to form a short cardanic fold which has a multiplicity of advantages in relation to the air spring units of the prior art.

The air spring unit designed according to the invention is preferably designed for an arrangement of the air spring cover at a chassis side and an arrangement of the air spring rolling piston at a running gear side. This is a so-called "downside-down arrangement". Such an arrangement may also be used in a reversed manner. Here, the air spring unit is designed for an arrangement of the air spring rolling piston at a chassis side and an arrangement of the air spring cover at a running gear side. This is a so-called "upside-down arrangement".

Such an "upside-down arrangement" is often used in conjunction with a double rolling fold at a running gear side. In the case of such an embodiment use can thus likewise be made of a short cardanic fold of the concept according to the invention.

By means of different geometrical heights of the bracing rings on the external guide and/or by means of differently spaced-apart positioning of the bracing rings with respect to that end of the external guide which is at the air spring cover side, it is possible, in a manner according to the invention, with an otherwise unchanged spacing between the top edge, at the air spring cover side, of the external guide and the cover, to realize different heights of the cardanic fold that is formed. In this way, it is thus possible for different heights of the cardanic fold to be set.

Also, the bracing ring of the cardanic fold can, in a manner according to the invention, be formed with different radial wall thickness in order to realize a particular radial resistance to loads imparted by the bellows in the air spring unit, in particular shortly before the rupturing of the air spring.

It is also possible for an intermediate element to be arranged on that end of the external guide which is at the air spring cover side, which intermediate element, by means of its particular shape, distributes the contact pressure between the rolling bellows and the end of the external guide over a greater area and thus prevents mechanical damage to the bellows.

The connection, which is dominant in terms of strength, between bellows and external guide may also be produced by means of other methods, such as for example adhesive connecting techniques (adhesive bonding) or further clampings, even from the inner side of the external guide.

As regards that end of the external guide which is at the air spring cover side, this may be shaped in a special manner. For example, here, there may be integrally formed an inwardly or outwardly directed collar in order to impede axial slippage of the bracing ring of the short cardanic fold relative to the external guide and/or in order to reduce the contact force between the outer side of the bellows and external guide as the bellows loops around that end of the external guide which is at the air spring cover side.

A further embodiment of the invention is characterized in that, in the region of the clamping between bracing ring and external guide, contour elements are arranged in that region of the external guide which faces toward the bracing ring and/or in that region of the bracing ring which faces toward the external guide. Such contour elements are for example teeth, grooves or encircling pockets. The strength of the clamping connection is hereby increased.

The bellows that forms the cardanic fold may also be formed as a turn-over bellows or hybrid bellows.

Furthermore, the bellows which forms the cardanic fold may be formed as a homogeneously fabricated bellows, for example as a cross-ply bellows, or as an axial bellows or as a bellows with variable thread angle.

The inhomogeneous bellows portion that is present in the case of some bellows types, for example the transition from the rolling bellows to the reinforced bellows pan of the turn-over bellows or hybrid bellows or the transition region between a thread angle that exists at the rolling fold side and a thread angle that exists at the cardanic fold side, may, in a manner according to the invention, preferably be arranged between that end of the external guide which is at the air spring cover side and the exit point of the bellows at the bottom edge, at the rolling fold side, of the bracing ring of the short cardanic fold. This positioning is particularly advantageous because the air spring bellows has only a sealing function but no dynamic function in this region.

In yet another preferred embodiment, the cardanic fold is at least partially sealingly lined from the inside by means of an additional component. Such an additional component may be an elastic component which distributes the internal pressure in an effective manner, and which, depending on requirements, is reinforced by means of strengthening members or fibers. By means of this component, the rupturing pressure resistance of the short cardanic fold is improved.

Here, "sealing lining" is intended to mean that substantially no internal pressure should pass between the additional component and the air spring bellows. Here, the sealing action may be achieved by means of clamping below the adjacent clampings, or cohesive or adhesive connection.

The abovementioned preferred embodiment, in the case of which that end of the external guide which is at the air spring cover side has an inwardly or outwardly directed collar, has a further advantage. Through the combination of the bracing ring positioning on the outwardly directed projecting collar with the positioning of the bracing ring against said projecting collar, a form fit of the bracing ring clamping against the vertical loading, remaining after looping, of the clamping is realized. Measures for increasing the clamping strength, such as are normally necessary in the case of a normal cardanic fold according to the prior art (contours, grooves, teeth etc.), can thus be omitted.

FIG. 1 shows a part of an air spring unit of the prior art in a longitudinal sectional view. The air spring unit has a rolling bellows 1, which is clamped on an air spring rolling piston 4 and which rolls on the latter so as to form a rolling fold 5. Furthermore, the rolling bellows 1 is clamped to an air spring cover, as shown at 3. The rolling bellows 1 lies radially at the inside against an external guide 2.

This externally guided air spring unit is designed for performing a purely axial spring movement. In order to decouple corresponding additional movements and isolate these from the rolling fold 5 of the air spring bellows 1, a cardanic fold 6 is provided. To form this cardanic fold 6, the external guide 2 is not fastened directly to the air spring cover, but rather is fastened, spaced apart from the cover, to the air spring bellows 1. Thus, that end of the rolling bellows 1 which is at the cover side emerges from the external guide 2 from the inside in an upward direction in FIG. 1 and forms a cardanic fold 6, because the radial supporting action of the external guide 2 is absent where the bellows emerges, and the internal pressure is absent. In this embodiment of the prior art, the cardanic fold 6 is therefore formed between external guide 2 and cover clamping 3 above the external guide 2.

Figure 2:
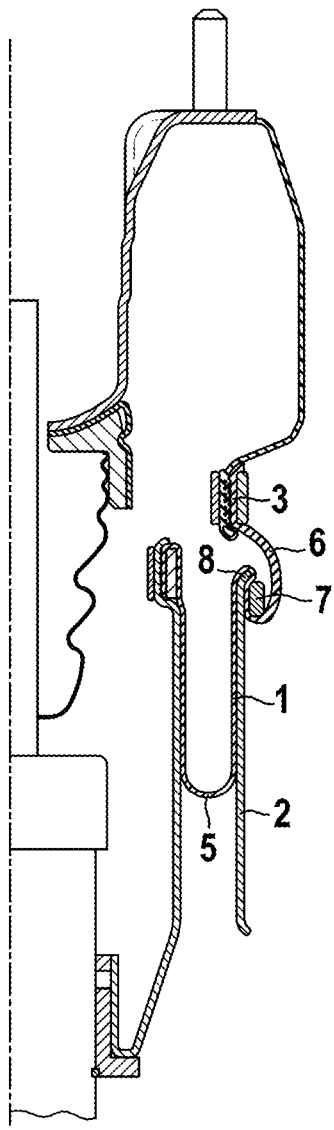
FIG. 2 shows a longitudinal section through a part of an air spring unit according a first embodiment.

FIG. 2 shows an exemplary embodiment of an air spring unit. Here, after exiting the external guide 2 which is spaced apart from the cover clamping 3, the bellows 1 is firstly folded around that end of the external guide 2 which is at the cover side, and led back in the direction of the rolling fold 5, such that the bellows 1, after exiting that end of the external guide 2 which is at the cover side, firstly loops around said end axially, is then clamped by means of a bracing ring 7, which presses against the former bellows inner side, so as to be positioned against the external guide 2 from the outside, and then, only after exiting at the bottom side of the external guide bracing ring 7 at the rolling fold side, is turned up again in the direction of the cover clamping 3 and is guided in the direction of the cover clamping 3 so as to form the cardanic fold 6. This special type of bellows guidance ensures, correspondingly to the geometrical relationships, that the cardanic fold 6 starts, at the side of the rolling fold, below that end of the external guide 2 which is at the cover side, starting on the outer side of the external guide 2.

Figure 3:
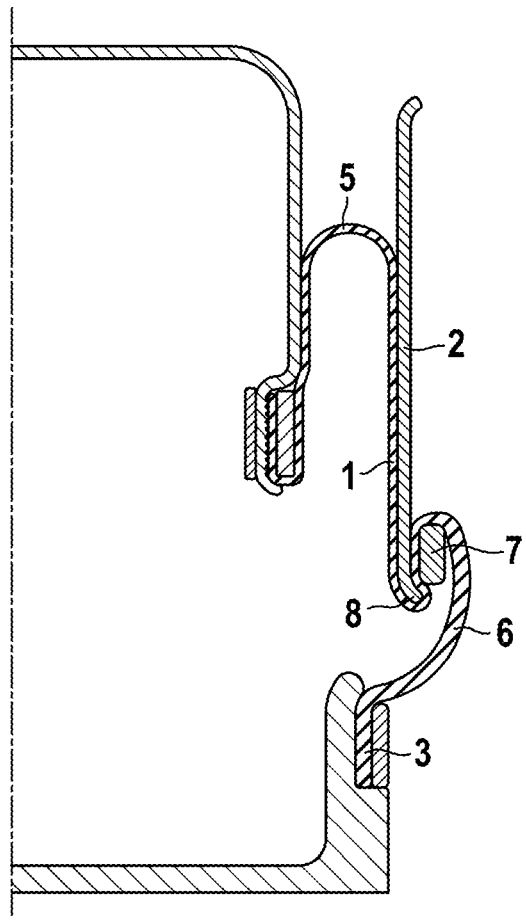
FIG. 3 shows a view as in FIG. 2 of a second embodiment.

The arrangement of the short cardanic fold 6 illustrated in FIG. 2, with an arrangement of the air spring cover at a chassis side and an arrangement of the rolling piston at a running gear side, can, by being turned around, be used with an arrangement of the rolling piston at a chassis side and an arrangement of the air spring cover at a running gear side, as illustrated in FIG. 3. In this case, too, the cardanic fold 6 starts, at the side of the rolling fold, below that end of the external guide 2 which is at the cover side, only in a reversed manner in relation to the embodiment of FIG. 2.

The embodiments shown in FIGS. 2 and 3 furthermore have an external guide 2, that end of which which is at the cover side has a radially outwardly extending collar 8 in order to impede axial slippage of the bracing ring 7 relative to the external guide 2 and/or in order to reduce the contact force between the outer side of the bellows 1 and the external guide 2 as the bellows loops around that end of the external guide 2 which is at the cover side.

Figure 4:
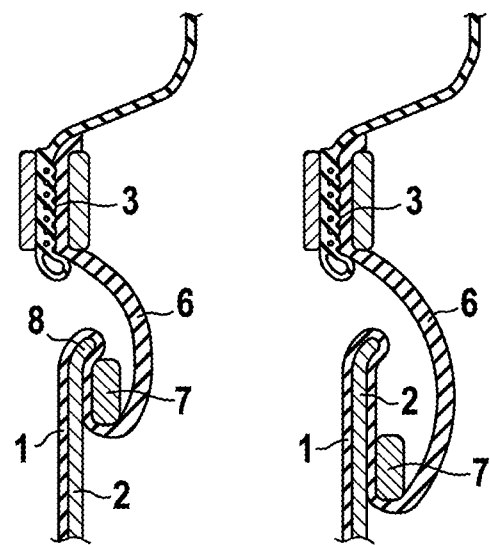
FIG. 4 shows a view as in FIG. 2 of a third and fourth embodiment.

FIG. 4 shows two further exemplary embodiments of an air spring unit. By means of different geometrical heights of the bracing rings 7 on the external guide 2 and/or by means of differently spaced-apart positioning of the bracing rings 7 with respect to that end of the external guide 2 which is at the cover side, it is possible, with an otherwise unchanged spacing between the top edge, at the cover side, of the external guide 2 and the cover, to realize different heights of the cardanic fold 6 that is formed.

Figure 5:
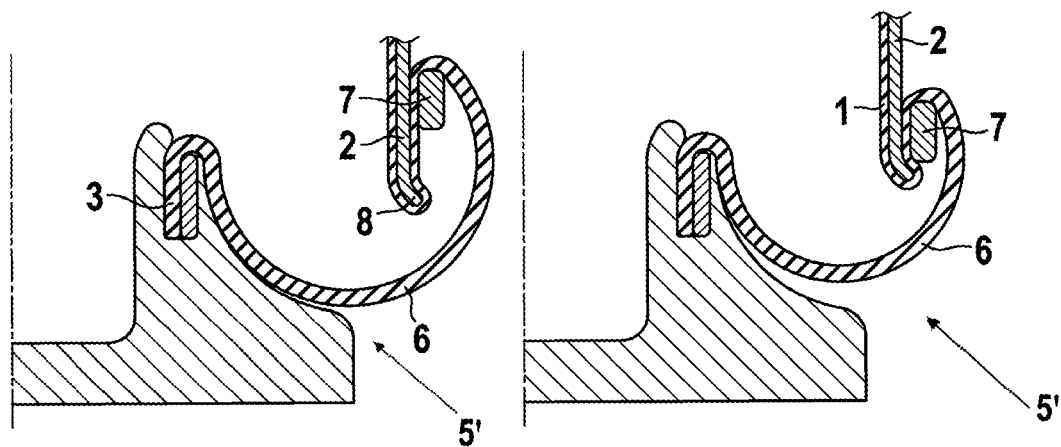
FIG. 5 shows a view as in FIG. 2 of a fifth and sixth embodiment.
Figure 6:
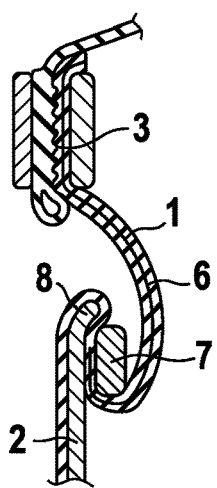
FIG. 6 shows a view as in FIG. 2 of a seventh embodiment.
Figure 7:
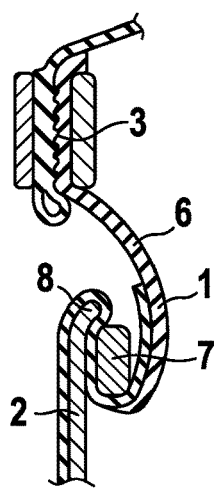
FIG. 7 shows a view as in FIG. 2 of an eighth embodiment.
Figure 8:
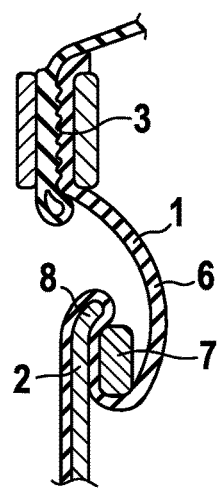
FIG. 8 shows a view as in FIG. 2 of a ninth embodiment.

The abovementioned possibility of setting the exit points of the short cardanic fold 6 in a varied manner is illustrated in FIG. 5 on the basis of two further exemplary embodiments. An identical exit point can be set by means of a spacing of the bracing ring 7 in the case of the left-hand embodiment or by means of a bracing ring geometry without additional spacing in the case of the right-hand embodiment. In the case of the embodiment illustrated in FIG. 6, the bellows 1 that forms the cardanic fold 6 is designed as a turn-over bellows. In the case of the embodiment illustrated in FIG. 7, the bellows 1 is designed as a hybrid bellows. In the embodiment of FIG. 8, as a homogeneously fabricated bellows.

FIG. 5 illustrates a double rolling fold at a running gear side having a first rolling fold at 5 and second rolling fold at 5'. In the case of such an embodiment, use can thus likewise be made of a short cardanic fold.

Figure 9:
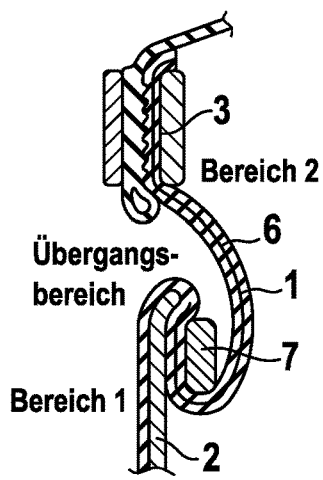
FIG. 9 shows a view as in FIG. 2 of a tenth embodiment.

FIG. 9 shows an embodiment in which an inhomogeneous bellows portion, for example the transition from the rolling bellows (region 1) to the reinforced bellows part of the turn-over bellows (region 2) or hybrid bellows or the transition region between a thread angle that exists at the rolling fold side and a thread angle that exists at the cardanic fold side, is arranged between that end of the external guide 2 which is at the cover side and the exit point of the bellows 1 at the bottom edge, at the rolling fold side, of the bracing ring 7 of the cardanic fold 6.

Figure 10:
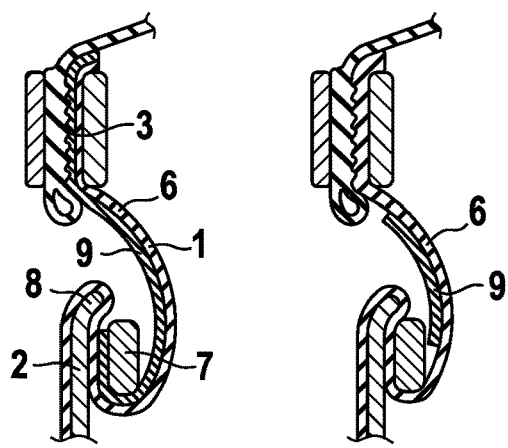
FIG. 10 shows a view as in FIG. 2 of an eleventh and twelfth embodiment.

FIG. 10 shows an embodiment in which the cardanic fold 6 is "sealingly" covered from the inside by means of an additional elastic component 9, which distributes the internal pressure in an effective manner. The right-hand image in FIG. 1*i* shows a situation in which said component 9 only partially "sealingly" lines the cardanic fold 6.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

LIST OF REFERENCE DESIGNATIONS

1 Rolling bellows
2 External guide
3 Air spring cover clamping
4 Air spring rolling piston
5 Rolling fold
6 Cardanic fold
7 Bracing ring
8 Collar
9 Component

The invention claimed is:

1. An air spring unit for a vehicle, the air spring unit comprising:
an air spring cover, an air spring rolling piston, a bellows forms a rolling fold and a cardanic fold, the bellows is arranged between the air spring cover and air spring rolling piston, and an external guide for the bellows;
the external guide is arranged with a spacing to a clamping of the bellows at the air spring cover, the bellows extends from the rolling fold, around an end of the external guide which is at the air spring cover side, so as to loop around said end, and back in the direction of the rolling fold, is subsequently clamped by a bracing ring so as to be positioned against the external guide from the outside, and, after exiting the bracing ring at the bottom side thereof at the rolling fold side, is turned up again in the direction of the air spring cover clamping and is guided in the direction of the air spring cover clamping so as to form the cardanic fold; and
wherein different heights of the cardanic fold can be set by a different geometrical height of the bracing ring on the external guide and/or by positioning the bracing ring with a different spacing to that end of the external guide disposed at the air spring cover side.

2. The air spring unit as claimed in claim 1, wherein the air spring cover is disposed at a chassis side and arrangement of the air spring rolling piston at a running gear side.

3. The air spring unit as claimed in claim 1, wherein the air spring rolling piston is disposed at a chassis side and arrangement of the air spring cover at a running gear side.

4. The air spring unit as claimed in claim 3, wherein the air spring rolling piston has a double rolling fold at the running gear side.

5. The air spring unit as claimed in claim 1, wherein the bracing ring is formed with a different radial wall thickness than the radial wall thickness of the external guide.

6. The air spring unit as claimed in claim 1, wherein an intermediate element is arranged on that end of the external guide which is at the air spring cover side.

7. The air spring unit as claimed in claim 1, wherein an end of the external guide which is at the air spring cover side has an inwardly or outwardly directed collar.

8. The air spring unit as claimed in claim 1, wherein in the region of the clamping between bracing ring and external guide, contour elements are arranged in that region of the external guide which faces toward the bracing ring and/or in that region of the bracing ring which faces toward the external guide.

9. The air spring unit as claimed in claim 1, wherein the bellows which forms the cardanic fold is formed as a turn-over bellows or hybrid bellows.

10. The air spring unit as claimed claim 1, wherein the bellows which forms the cardanic fold is formed as a homogeneously fabricated bellows or as a bellows with variable thread angle.

11. The air spring unit as claimed in claim 1, wherein the bellows has an inhomogeneous bellows portion which is arranged between that end of the external guide which is at the air spring cover side and the exit point of the bellows at the bottom edge, at the rolling fold side, of the bracing ring.

12. The air spring unit as claimed in claim 1, wherein the cardanic fold is at least partially sealingly lined from the inside by an additional component.

* * * * *